A. V. ROE.
FASTENER FOR COVERS.
APPLICATION FILED JAN. 8, 1918.

1,301,749. Patented Apr. 22, 1919.

Inventor:
A. V. ROE.
per: Geo. A. Hutchinson
Attorney.

UNITED STATES PATENT OFFICE.

ALLIOTT VERDON ROE, OF HAMBLE, ENGLAND.

FASTENER FOR COVERS.

1,301,749.　　　　　Specification of Letters Patent.　　Patented Apr. 22, 1919.

Application filed January 8, 1918. Serial No. 210,934.

*To all whom it may concern:*

Be it known that I, ALLIOTT VERDON ROE, a subject of the King of Great Britain, residing at Hamble, Southampton, England, have invented certain new and useful Improvements in Fasteners for Covers, of which the following is a specification.

This invention relates to improvements in the construction of clips or clasps for holding down covers and the like. Though applicable to fastening devices on vehicles and other goods it is especially applicable for holding down the cover plates or other parts found upon aircraft. A main object of the invention is to make a clasp in a form which offers no appreciable resistance to the passage through the air of the part to which it is attached; a second object of the invention is to provide such a clasp of neat appearance when used in other situations than upon aircraft.

The accompanying drawings illustrate the invention as applied to the fastening of covers on aircraft, for example to the fastening of a metal cover to a rail on an aeroplane fuselage.

Figure 2:
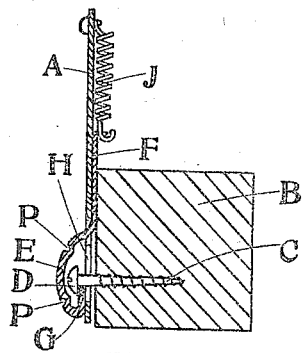
Figure 4:
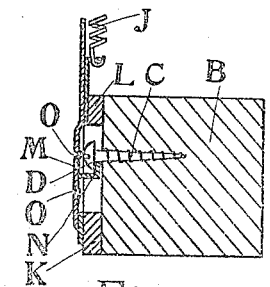
Figure 1:
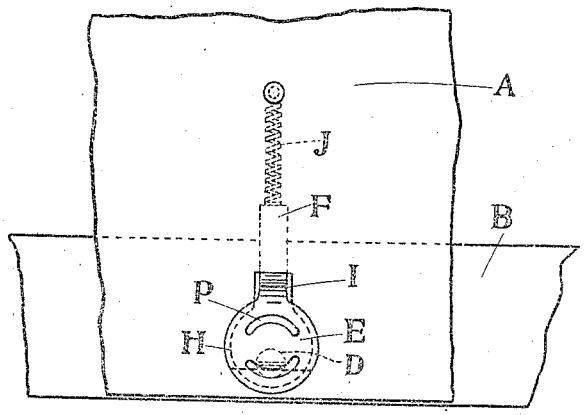
Figure 5:
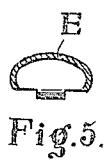
Figure 3:
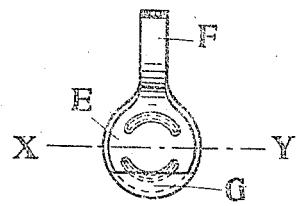
Figure 6:
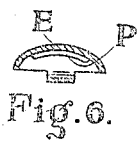

Figure 1 is a side elevation of the domed clasp in place; Fig. 2 is a sectional elevation of Fig. 1; Fig. 3 represents the clasp in reverse position; Fig. 4 shows a modification providing a fastening almost flat with the surface of the cover; Fig. 5 shows a clasp having bulging sides so as to be movable without finger grooves; and Fig. 6 shows a section through the line X, Y on Fig. 3.

It has hitherto been proposed to employ a coiled spring inside the cover or casing being fastened, this spring being connected by means of a bent portion passing through a hole in the cover to the outside with an open clip, and a similar internal retracting spring may be employed with this invention.

Referring first to Figs. 1, 2 and 3, A is the part of the cover requiring attachment to the rail B, and C is a screw attached to the latter upon which the clasp E of the clip F is fastened by pulling the projecting lip G under the overhanging head D of the screw C. The spring J is attached to the cover at any suitable point on the inside thereof.

In order that the clasp E can be gripped by the fingers, its edges at the side are preferably made to bulge outward as indicated in Figs. 5. Alternatively, or in addition to the bulging sides a groove or grooves P may be formed in the surface of the dome E which can be used by the finger-nails to move the domed clasp, especially when the sides of it are made of flatter contour as shown in Fig. 6. As shown in Fig. 1, the hole H is cut in the cover A and is made with the slotted extension I to allow the bent part of the shank F to be passed through it and retracted sufficiently to bring the lip G beneath the head D of the screw C; thus, when the fastening is complete, the only projecting surface offering resistance to the air is that of the dome of the clasp E which is shaped so that its resistance to the air is almost negligible.

The under-turning of the sides of this domed part, as stated above, is so that it can be more easily gripped by the fingers. It may be produced as a casting, or, in a cheaper form, it may be stamped from flat plate.

Referring to the modification shown in Fig. 4, it will be seen that packing pieces K, L are affixed to the spar B so as to make a recess for the screw-head D; the surface of the clasp M is made flat in this case, being provided with straight finger-nail grooves O, O, by which it can be moved up and down, and it has a projecting catch in the form of an angle plate N arranged so that it will pass under the head D of the screw when retracted by the spring of the clip.

In each case mentioned above no sudden break occurs in the cover itself or in the clasp, consequently a very neat and effective fastening for the cover is produced.

The invention is especially serviceable for holding down the cover plates on the sides of aeroplane bodies, the covers of the motor, or other parts of similar character used upon aircraft where it is important that as little resistance as possible shall be offered to the passage of air over the said surface, since any sudden break or projection of surface tends to decrease the speed of the aircraft through the air, especially if a number of such breaks occur on the same surface.

I claim:

1. In a fastening device of the class described, the combination of a cover having a hole with a slotted extension in one direction within the periphery of its edge, an overhanging projection on the part to which the cover is to be fastened disposed within the limits of the said hole, a clasp having a shank with a bend in it, the said bent portion passing through the slotted extension of the cover hole and adapted substantially to close in the cover hole, means for engaging the said clasp with the said projection, and means on the inside of the said cover for retaining the clasp and the projection in engagement.

2. In a fastening device of the class described, the combination of a cover having a hole with a slotted extension in one direction within the periphery of its edge, an overhanging projection on the part to which the cover is to be fastened disposed within the limits of the said hole, a clasp having a shank with a crank in it, the said cranked portion passing through the slotted extension of the cover hole and adapted substantially to close in the cover hole, a projecting plate or piece on the inside of the said clasp adapted to pass under the overhanging projection, and spring-controlled means disposed on the inside of the said cover for retaining the clasp and the projection in engagement.

3. In a fastening device of the class described, the combination of a cover having a hole with a slotted extension in one direction within the periphery of its edge, an overhanging projection on the part to which the cover is to be fastened disposed within the limits of the said hole, a domed clasp attached to the end of a shank passing through the said slotted extension of the cover hole and adapted substantially to close in the cover hole, a plate partially closing in the base of the dome and forming a lip adapted to pass under the overhanging projection, and retracting means connecting the said shank with a stationary fixing on the inside of the cover, whereby when the said lip engages the said projection it is retained in place by the said retracting means.

4. In a fastening device of the class described, the combination of a cover having a hole with a slotted extension in one direction within the periphery of its edge, an overhanging projection on the part to which the cover is to be fastened disposed with the limits of the said hole, a domed clasp of flattened contour attached to the end of a shank passing through the said slotted extension of the cover hole and adapted to close in the cover hole, a plate partially closing in the base of the dome and forming a lip adapted to pass under the overhanging projection, finger-nail grooves on the external surface of the said domed clasp, and retracting means connecting the said shank with a stationary fixing on the inside of the cover, whereby when the said lip engages the said projection it is retained in place by the said retracting means.

In testimony whereof I affix my signature.

ALLIOTT VERDON ROE.

Copies of this patent may be obtained for five cents each, by addressing the "Commissioner of Patents, Washington, D. C."